(12) United States Patent
Sheikh et al.

(10) Patent No.: US 8,774,556 B2
(45) Date of Patent: Jul. 8, 2014

(54) PERSPECTIVE CORRECTION USING A REFLECTION

(75) Inventors: Suhel Sheikh, Affoltern am Albis (CH); Shawn M. Brown, Redmond, WA (US); Stephen Cosman, Redmond, WA (US); Robert Pengelly, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 233 days.

(21) Appl. No.: 13/308,177

(22) Filed: Nov. 30, 2011

(65) Prior Publication Data

US 2013/0137482 A1    May 30, 2013

(51) Int. Cl.
*G06K 9/40* (2006.01)

(52) U.S. Cl.
USPC ........... 382/275; 382/274; 382/291; 345/649; 345/474; 345/174

(58) Field of Classification Search
USPC .......... 382/274, 275, 291, 295, 296; 345/649, 345/474, 174
See application file for complete search history.

(56) References Cited

U.S. PATENT DOCUMENTS

| | | | |
|---|---|---|---|
| 5,699,444 A | 12/1997 | Palm | |
| 6,236,404 B1 | 5/2001 | Iimura et al. | |
| 6,373,518 B1 | 4/2002 | Sogawa | |
| 6,621,448 B1 * | 9/2003 | Lasky et al. | 342/22 |
| 6,968,094 B1 | 11/2005 | Gallagher | |
| 6,993,450 B2 | 1/2006 | Takemoto et al. | |
| 7,747,151 B2 * | 6/2010 | Kochi et al. | 396/55 |
| 7,881,878 B2 * | 2/2011 | Burrus et al. | 702/28 |
| 7,950,004 B2 * | 5/2011 | Vieira et al. | 717/125 |
| 7,995,814 B2 * | 8/2011 | Fingler et al. | 382/128 |
| 8,369,594 B2 * | 2/2013 | Fingler et al. | 382/128 |
| 8,378,608 B2 * | 2/2013 | Robertson | 318/438 |
| 8,613,493 B1 * | 12/2013 | Burke et al. | 347/19 |
| 8,625,815 B2 * | 1/2014 | DeLine et al. | 381/86 |
| 2004/0022451 A1 | 2/2004 | Fujimoto et al. | |
| 2011/0157396 A1 | 6/2011 | Kotani | |

OTHER PUBLICATIONS

Mohan et al., "Rectification of Perspective Distortion Using Camera Parameters—A Perspective Geometry Based Approach," ICGST-GVIP Journal, vol. 8(1):1-7 (2008).
Rodríguez-Piñeiro et al., "A New Method for Perspective Correction of Document Images," Proc. SPIE 7874, 787410 (Jan. 2011).

* cited by examiner

*Primary Examiner* — Yosef Kassa
(74) *Attorney, Agent, or Firm* — Tony Azure; Andrew Sanders; Micky Minhas

(57) ABSTRACT

Techniques and tools are described for performing perspective correction using a reflection. Reflective properties of a surface being photographed can be used to determine a rotation of the device taking the photograph relative to the surface. Light sourced or produced by the device can be used to create a reflection spot in the picture. A position of the reflection spot within the picture is calculated and used to determine the rotation. The rotation can be used for performing perspective correction on the picture, or on another picture taken by the device.

23 Claims, 11 Drawing Sheets

PERSPECTIVE CORRECTION USING A REFLECTION

FIELD

This application relates to perspective correction and, in particular, perspective correction using a reflection.

BACKGROUND

Perspective distortion is common in pictures when a camera is not parallel to surfaces or edges that are being photographed. For example, a tall building photographed from the ground at a distance may appear slanted in the image, or the edges of the building may appear non-vertical (or convergent) even though the building is in reality vertical. As another example of perspective distortion, text or words on a photographed surface (e.g., a document, whiteboard/blackboard, or product) can appear distorted and difficult to read when the camera is not parallel to the photographed surface. Such distortion can sometimes be corrected using various perspective correction techniques.

Perspective correction for a picture is commonly performed by detecting the border or an edge of a surface in the picture. The position and orientation of the edge within the picture may be used to determine the position of the surface in space. Then, a transform can be applied to that surface to adjust the perspective. However, when a picture does not include a border or an edge, it can be difficult or impossible to determine the position of the surface in space and, thus, to correct the perspective distortion. For example, some perspective correction techniques require that one or more edges of a photographed document be included in the photo in order to correct perspective distortion of the text appearing on the document. Such a requirement can be impractical or impossible to realize. For example, a user taking the photograph may not be able to position his or herself such that the surface being photographed, and requiring perspective correction, is entirely within the viewfinder of the camera.

SUMMARY

Described below are techniques and tools for perspective correction. For example, reflection properties of a surface being photographed can be utilized to determine a rotation of the device taking the photograph and to facilitate the correction of perspective distortion in that photograph. One advantage is that perspective correction can be performed on pictures that do not contain an edge or border of the photographed surface. In other words, edge detection is not required in order to perform perspective correction. Thus, in some implementations, tools and techniques described herein allow perspective correction to be applied more easily or to additional images than conventional techniques.

In one embodiment, image data corresponding to a picture captured by a picture-taking device is received. The picture includes a reflection spot caused by a reflection of light sourced or produced by the picture-taking device off a surface in the picture. A position of the reflection spot within the picture is calculated from the image data. A rotation of the picture-taking device relative to the surface is then determined using the calculated position. Perspective correction can then be performed on the image, or on another image of the surface, using the calculated rotation.

This summary is provided to introduce a selection of concepts in a simplified form that is further described below in the detailed description. This summary is not intended to identify key features or essential features of the claimed subject matter, nor is it intended to be used to limit the scope of the claimed subject matter.

The foregoing and additional features and advantages will become more apparent from the following detailed description, which proceeds with reference to the accompanying figures.

DETAILED DESCRIPTION

Example 1

Exemplary Mobile Computing Device

Figure 1:
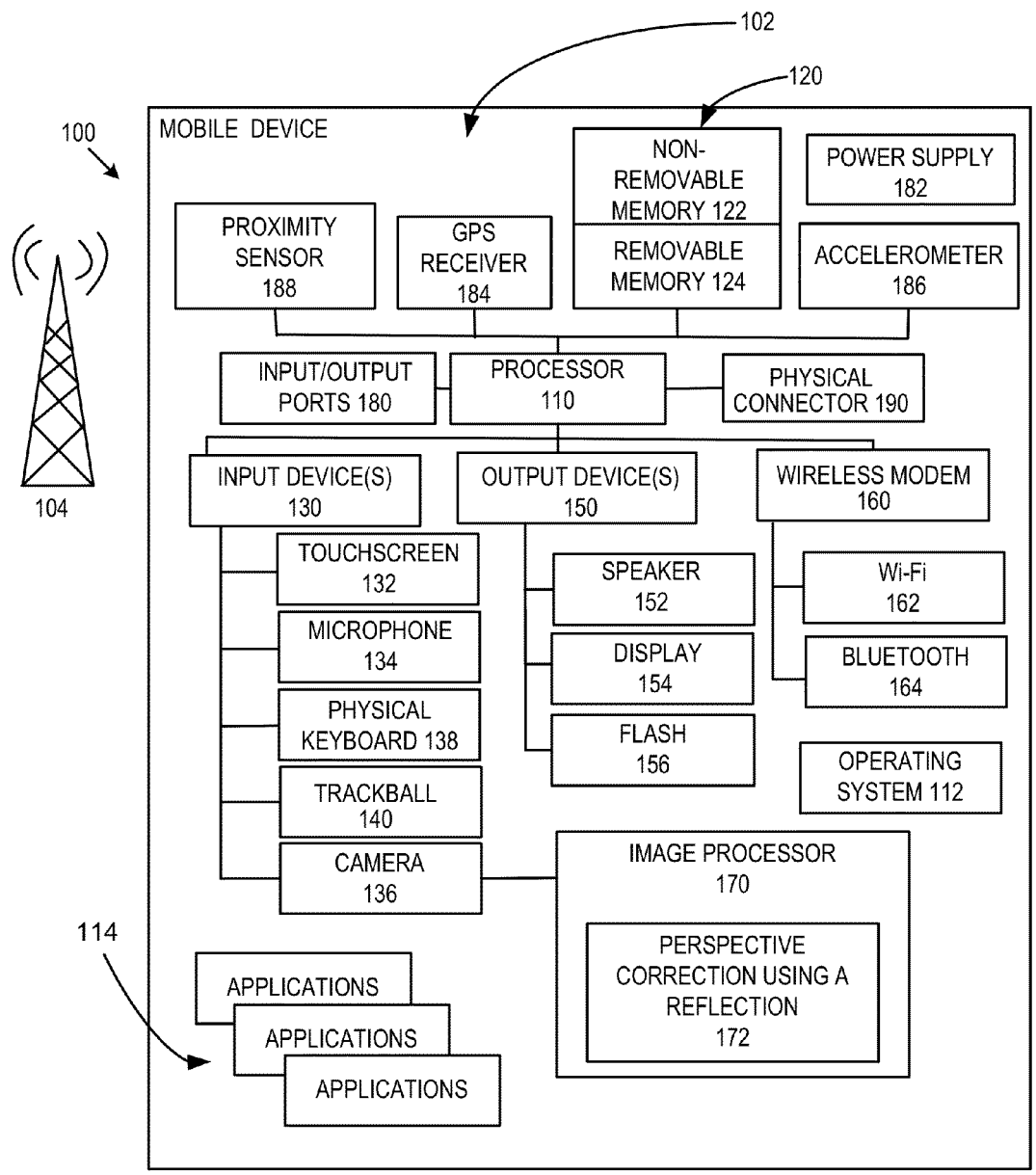
FIG. 1 is a detailed block diagram illustrating an example mobile computing device including an image processor configured according to techniques and tools described herein.

FIG. 1 is a detailed diagram depicting an exemplary mobile computing device 100 capable of implementing the techniques and solutions described herein. The mobile device 100 includes a variety of optional hardware and software components, shown generally at 102. In general, any component 102 in the mobile device can communicate with any other component in the mobile device, although not all connections are shown for ease of illustration. The mobile device can be any of a variety of computing devices (e.g., cell phone, smartphone, handheld computer, laptop computer, notebook computer, tablet device, netbook, media player, Personal Digital Assistant (PDA), camera, video camera, etc.) and can allow wireless two-way communications with one or more mobile communications networks 104, such as a Wi-Fi, cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well-known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 is an example picture-taking device as described herein. Specifically, the mobile device 100 supports a flash unit 156 and a camera 136 configured to take pictures and to generate image data representing the pictures. Further, the flash unit 156 can be used to create reflection spots in the pictures as described herein. The mobile device 100 also includes an image processor 170 configured to receive images from the camera 136. The image processor 170 can process the received images using various techniques known in the art. However, the processor 170 also contains a unit 172 for performing perspective correction using a reflection, according to tools and techniques described herein.

The mobile device 100 can support one or more input devices 130, such as a touchscreen 132 (e.g., capable of capturing finger tap inputs, finger gesture inputs, or keystroke inputs for a virtual keyboard or keypad), microphone 134, physical keyboard 138 and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device.

A wireless modem 160 can be coupled to one or more antennas (not shown) and can support two-way communications between the processor 110 and external devices, as is well understood in the art. The modem 160 is shown generically and can include a cellular modem for communicating at long range with the mobile communication network 104, a Bluetooth-compatible modem 164, or a Wi-Fi compatible modem 162 for communicating at short range with an external Bluetooth-equipped device or a local wireless data network or router. The wireless modem 160 is typically configured for communication with one or more cellular networks, such as a GSM network for data and voice communications within a single cellular network, between cellular networks, or between the mobile device and a public switched telephone network (PSTN).

The mobile device can further include at least one input/output port 180, a power supply 182, a satellite navigation system receiver 184, such as a Global Positioning System (GPS) receiver, an accelerometer 186, a proximity sensor 188, and/or a physical connector 190, which can be a USB port, IEEE 1394 (FireWire) port, and/or RS-232 port. The illustrated components 102 are not all required or all-inclusive, as the components shown can be deleted and other components can be added.

Figure 11:
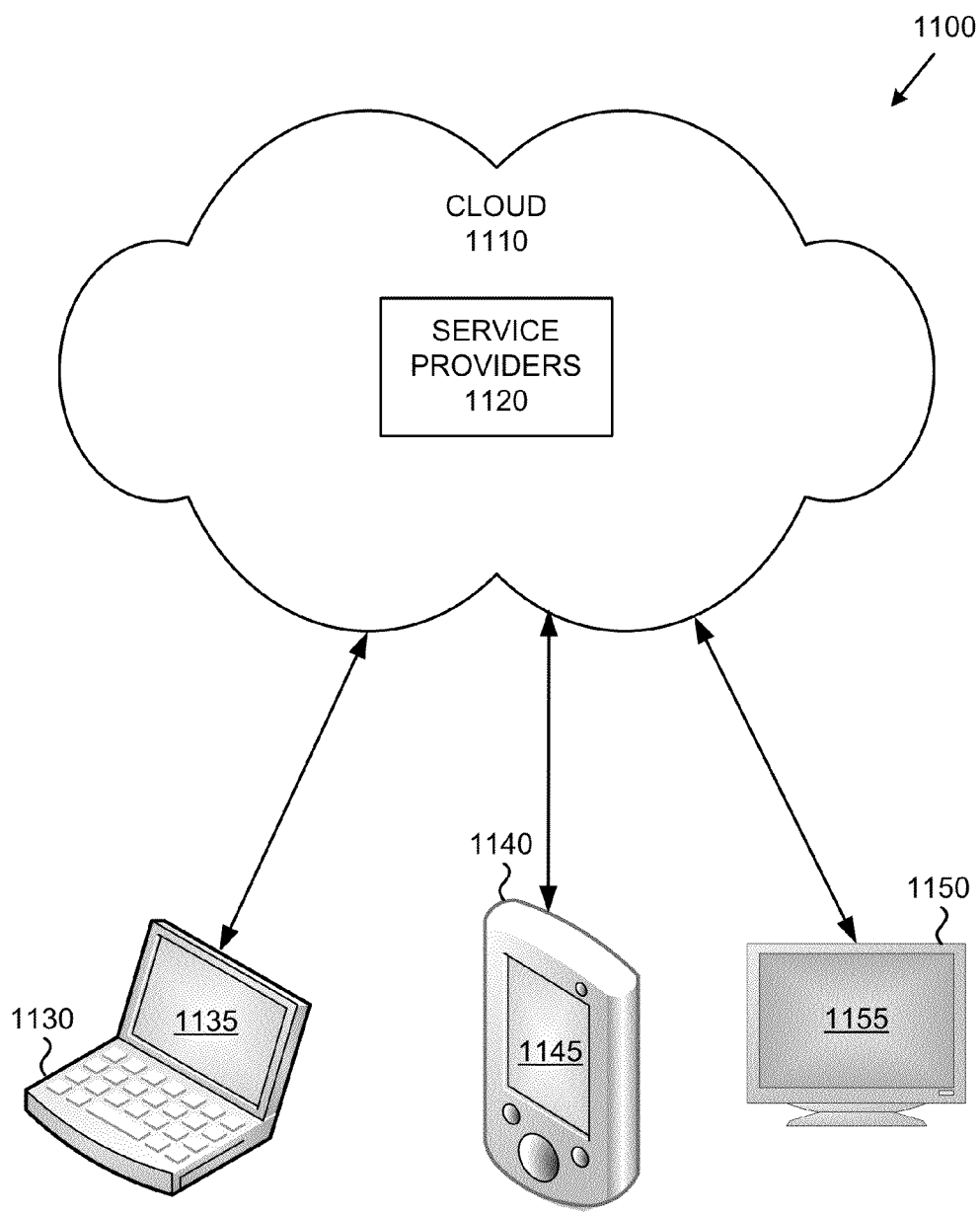
FIG. 11 illustrates a generalized example of a suitable implementation environment in which described embodiments, techniques, and technologies may be implemented.

The mobile device 100 can be part of an implementation environment in which various types of services (e.g., computing services) are provided by a computing "cloud" (see, for example, FIG. 11).

Example 2

Exemplary Picture-Taking Device

As used herein, a picture-taking device is any device that is capable of capturing or taking a picture and producing data representing that picture in digital form (e.g., image data). Exemplary picture-taking devices include any digital camera or any device including such a camera. For example, a picture-taking device can be a mobile telephone, computer, tablet device, or other computing device connected to or integrated with a camera.

The picture-taking devices described herein are capable of producing light that can create a reflection spot in pictures taken by the device. That is, when a picture is being taken of a reflective surface, the light produced by the device can reflect off of the surface and create a reflection spot in the picture. Typically, the light is a brief flash of light (e.g., a fraction of a second), however the flash of light can be for any length of time. The light can be of a visible wavelength (i.e., visible light), or the light can be of a non-visible wavelength (e.g., infrared light). Further, the light can be polarized in a particular predetermined manner (e.g., linearly polarized). Light produced or sourced by the picture-taking device can be generated by a flash unit integrated with or separate from the picture-taking device. The light can be generated by any light source known in the art, such as any conventional flash unit. Typically, the light source is multi-directional, and not a uni-directional light source. For example, the light can be produced by a conventional electronic flash unit built into a digital camera, the light can be produced by a stand-alone flash unit separate or separable from a camera, or the light can be produced by an LED flash unit. In some examples, the distance or separation between the camera and the flash unit can be considered in performing the calculations described herein.

The picture-taking devices are configured to take pictures either while the light is being produced, or while the light is turned off. For example, the picture-taking device can be configured to take a pre-image while the light is being produced, and then to take a second, additional image after the light is turned off. In this manner, the pre-image contains a reflection spot but the second image does not. This can be advantageous if perspective correction is to be performed on the second image, and it is desirable that the corrected image does not include the reflection spot. In this case, the second image is taken shortly after the first image, such as less than $\frac{1}{10}$ of a second, $\frac{1}{100}$ of a second, or $\frac{1}{1000}$ of a second after the first image, or so that the picture-taking device does not move significantly in between the first and the second image. In another example, the picture-taking device can be configured to take the picture while the light is turned on, such that the picture includes a reflection spot. In this case, the reflection spot can be removed, if desired, from the picture before, after, or as part of perspective correction performed on the picture. For example, if the flash is infrared light or polarized light, the reflection spot can be filtered from the picture.

The picture-taking devices described herein can be characterized by various parameters. When the picture-taking device is or includes a camera, these parameters include the camera parameters. Such parameters include, for example, focal length, pixel size, angle of view (sometimes referred to as field of view), film or sensor size, digital multiplier, exposure time, contrast, brightness, sharpness, saturation, etc. However, this list is not exclusive and can include additional camera parameters. In general, these parameters describe internal aspects of the camera or conditions/settings under which a photo was taken. Typically, these parameters are stored in memory of the picture-taking device and can be included in or attached to the image data representing the picture. However, these parameters can be obtained separately from the image data.

Example 3

Exemplary System for Performing Perspective Correction

Figure 2:
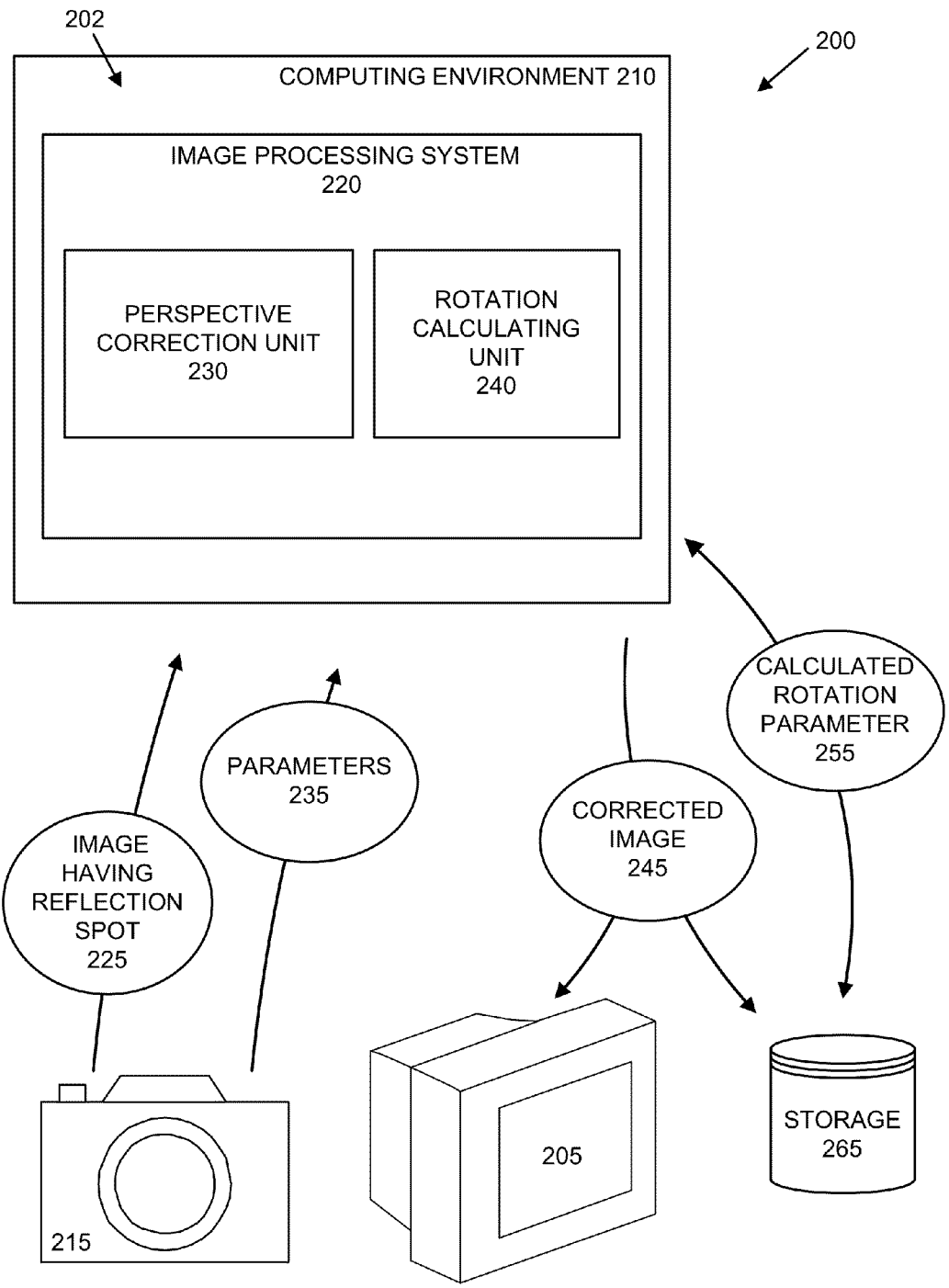
FIG. 2 is a block diagram illustrating an exemplary system capable of performing perspective correction using reflection properties of the surface being photographed.

FIG. 2 is a block diagram illustrating an exemplary system 200 capable of performing perspective correction using reflection properties of a surface being photographed. The system 200 includes a picture-taking device 215 as described herein. The device 215 captures an image 225 having a reflection spot and transmits that image 225 using techniques known in the art to a computing environment 210, which receives the image 225. The picture-taking device 215 also transmits parameters 235 to the computing environment 210, either with or separately from the image 225. Although not shown, the picture-taking device 215 can transmit other information to the computing environment 210, such as additional images with or without reflection spots. The computing environment 210 can be separate from the picture-taking device 215 or integrated with the picture-taking device 215 into a single device.

The computing environment 210 includes an image processing system 220, which receives the image 225 and the parameters 235 and generates a corrected image 245 and a rotation parameter 255 of the picture-taking device 215. The corrected image 245 has been corrected, at least in part, for perspective distortion by a perspective correction unit 230, and can be transmitted to a display 205 or placed in storage 265. The storage 265 can be any memory described herein. The display 205 and/or the storage 265 can be separate from the computing environment 210 or integrated with the computing environment 210 or the processing system 220 as part of a single device. The rotation parameter 255 can be output by the computing environment 210 or placed in storage 265. Further, the rotation parameter 255 can be used by the perspective correction unit 230 after being retrieved from the storage 265, or the rotation parameter 255 can be used directly by the perspective correction unit 230, without being placed in storage 265.

The perspective correction unit 230 and a rotation calculating unit 240 perform aspects of the image processing performed by the system 220. The rotation calculating unit 240 is configured to calculate the rotation parameter 255 using techniques and tools described herein. The unit 240 calculates the position of the reflection spot within the image 225 and determines the rotation parameter 255 using the calculated position. The perspective correction unit 230 is configured to apply perspective correction techniques to images received by the image processing system 220 using the rotation parameter 255 to generate the corrected image 245. The perspective correction techniques can be applied to the image 225 or to other images received from the picture-taking device 215. For example, the image 225 can be a pre-image, and the perspective correction techniques can be applied by the unit 230 to an additional, second image. Some of the perspective correction techniques described herein are those known in the art that use a rotation parameter of a picture-taking device to correct for perspective distortion in pictures taken by that device. For example, the unit 230 can apply a perspective correction transform known in the art to the image 225. However, perspective correction techniques applied by unit 230 do not require edge detection. The units 230 and 240 are shown as separate units for purposes of illustration. However, the units can be a single unit or integrated into one application.

In practice, the system 200 can be more complicated, with additional inputs, outputs and the like. For example, the computing environment 210 can include more components than illustrated components 202. Also, the picture-taking device 215, the display 205, the storage 265, or combinations thereof can be integrated with the computing environment 210, such as into one mobile device.

Example 4

Exemplary Picture with a Reflection Spot

Figure 3:
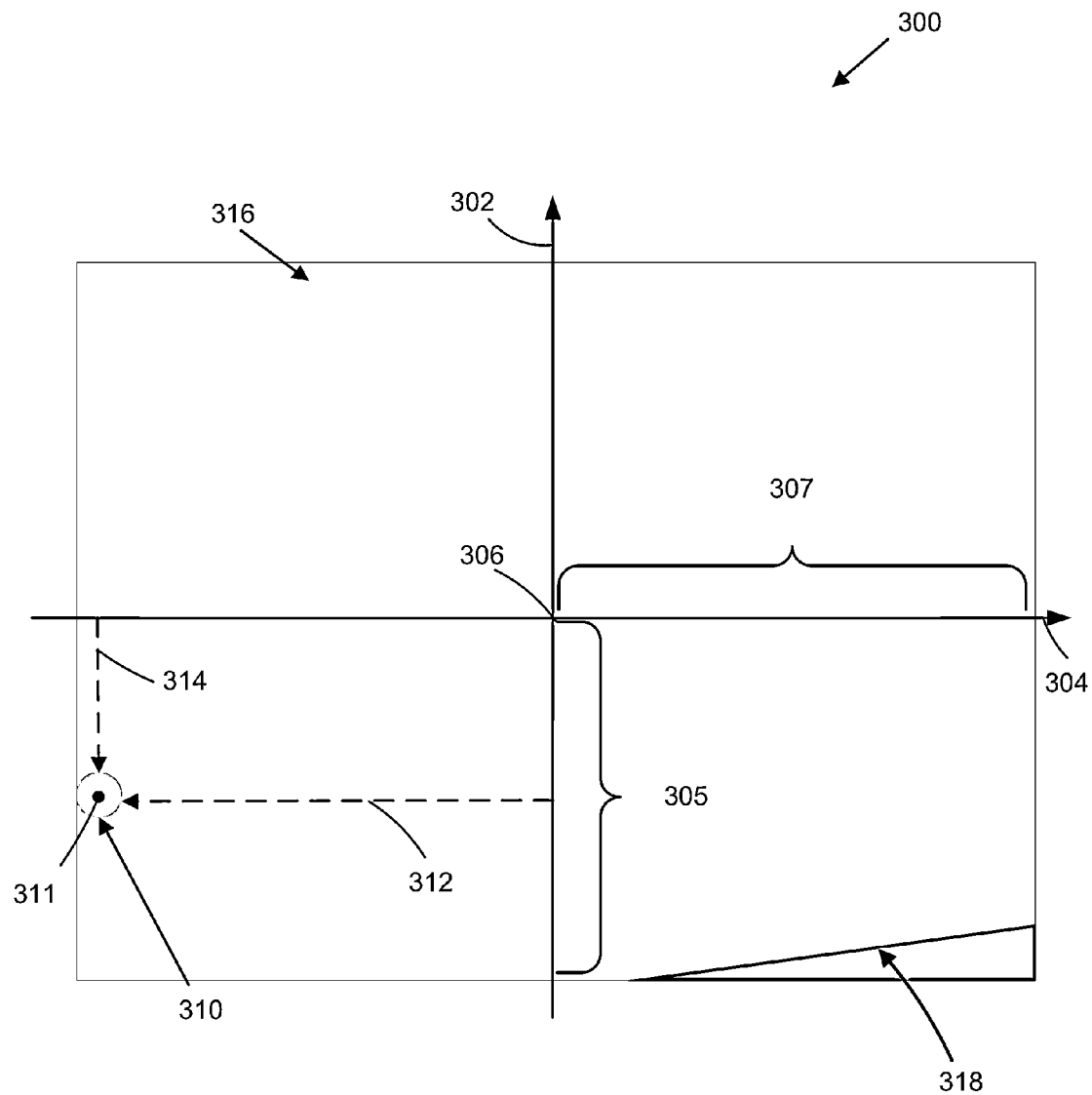
FIG. 3 is an exemplary picture with a reflection spot.

FIG. 3 shows an exemplary picture 300 with a reflection spot 310. The picture 300 is of a whiteboard 316 and includes a portion 318 of an edge of the whiteboard 316. The picture 300 was captured by a picture-taking device as described herein. The reflection spot 310 is caused by reflection of light sourced or produced by the picture-taking device off of the whiteboard 316. In this particular example, the picture 300 was taken by a digital camera, and the reflection spot 310 was produced by the flash unit built into the camera. Because the picture-taking device is rotated relative to the surface of the whiteboard 316, the reflection spot 310 does not appear at the center 306 of the image 300. Instead, the reflection spot 310 is displaced from the center 306. When the picture 300 was taken, the picture-taking device was tilted to the right and upwards relative to the whiteboard surface 316 thereby causing the reflection spot 310 to appear to the left and downwards from the center 306. In other words, the reflection spot 310 is displaced vertically by a distance 314 and horizontally by a distance 312 from the center 306.

The position of the reflection spot 310 within the image 300 can be calculated using a y-axis 302 and an x-axis 304. For example, the position can be represented by an x coordinate along the x-axis 304, represented by the distance 312, and a y coordinate along the y-axis 302, represented by the distance 314. These coordinates and distances can be measured relative to a center 311 of the reflection spot 310, or to any other part of the spot 310. The image 300 can also be characterized by a half-width 307 along the x-axis 304 and by a half-width 305 along the y-axis 302. A person of ordinary skill in the art would understand that the position of the reflection spot 310 can be determined using coordinate systems other than the one shown here. For example, the intersection of the axes 302 and 304 can be moved to a location other than center 306 within the image 300, and coordinates other than Cartesian coordinates can be used.

Figure 4:
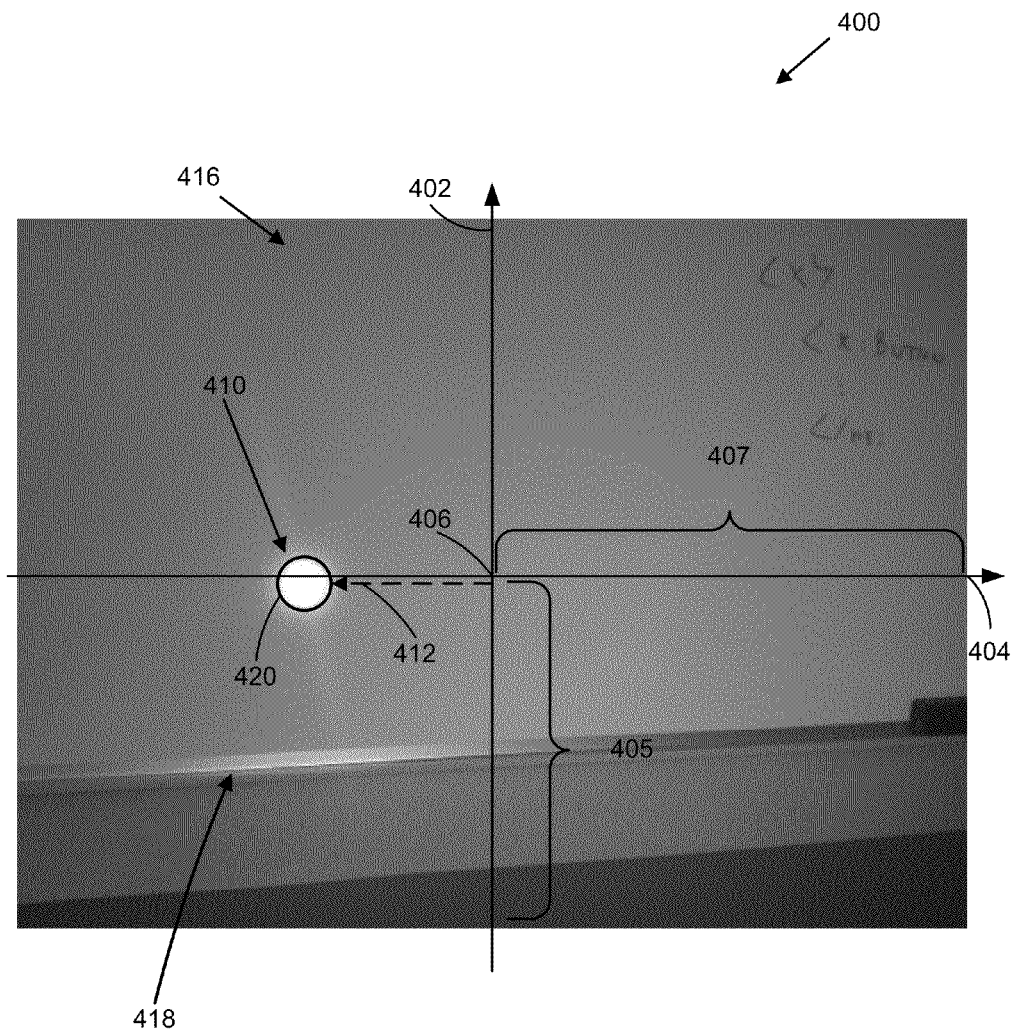
FIG. 4 is an exemplary picture with a reflection spot.

Calculations of distances or positions within pictures or images, such as the picture 300 in FIG. 3 or the picture 400 in FIG. 4, are made using the digital form of the picture. That is, the distances are calculated from image data representing the picture. A digital image is a numerical representation of a two-dimensional picture, and can be referred to as a bitmap image. These images are represented by a series, such as a two-dimensional array or several rows and columns, of digital values referred to as pixels. Each pixel represents brightness of light as captured for a particular position in the picture. Thus, distances or positions within the image can be measured in pixels. For example, the position of the reflection spot 310 can be calculated by determining a number of pixels between the reflection spot 310 and a reference point or axis. For example, the distance 312 or 314 can be represented by the number of pixels between the reflection spot 310 and the y-axis 302 or the x-axis 304, or the position of the reflection spot 310 can be represented by the number of pixels between the spot 310 and the center 306. A person of ordinary skill in the art would understand that the position of reflection spots such as the reflection spot 310 can be determined according to various techniques known in the art of digital image processing.

The reflection spot 310 appears in the image 300 as a bright white spot because the spot 310 corresponds to a group of adjacent saturated pixels and, thus, to a saturated region within the image 300. A saturated pixel is a pixel having a value above a predetermined threshold value for the particular picture-taking device that captured the picture. For example, a saturated pixel can have a maximum value for the particular device. There are techniques well-known in the art for detecting saturated pixels and for determining the location of saturated pixels within an image. Such techniques can therefore be used to determine a position of a reflection spot when that spot corresponds to a saturated region.

Although the reflection spot 310 is shown as a group of saturated pixels in FIG. 3, reflection spots in general are not always represented by saturated pixels. For example, a reflection spot may just be a bright spot on an image and, thus, a region of non-saturated pixels. However, the pixels may be near saturation. In that case, the contrast of the image can be increased in order to develop a saturation region, and the position of the reflection spot can be determined using techniques for locating saturated pixels.

Example 5

Exemplary Picture with a Reflection Spot

FIG. 4 shows an exemplary picture 400 with a reflection spot 410. The picture 400 is of a whiteboard 416 and includes a portion 418 of an edge of the whiteboard 416. The picture 400 was captured by a picture-taking device as described herein. The reflection spot 410 is caused by reflection of light sourced or produced by the picture-taking device off of the whiteboard 416. In this particular example, the picture 400 was taken by a digital camera, and the reflection spot 410 was produced by the flash unit built into the camera. Because the picture-taking device is rotated relative to the surface of the whiteboard 416, the reflection spot 410 does not appear at the center 406 of the image 400. Instead, the reflection spot 410 is displaced from the center 406. When the picture 400 was taken, the picture-taking device was rotated to the right relative to the surface of the whiteboard 416. In other words, the reflection spot 410 is displaced horizontally from the center 406 by a distance 412. Although not drawn in the figure, the reflection spot 410 is also displaced vertically from the center 406 by a small amount, indicating that the picture-taking device was also rotated slightly upwards when the picture 400 was taken.

The position of the reflection spot 410 within the image 400 can be calculated using a y-axis 402 and an x-axis 404. For example, the position can be represented by an x coordinate along the x-axis 404, represented by the distance 412. The coordinates and distances can be measured relative to a center of the reflection spot 410, or to any other part of the spot 410. The image 400 can also be characterized by a half-width 407 along the x-axis 404 and by a half-width 405 along the y-axis 402. A person of ordinary skill in the art would understand that the position of the reflection spot 410 can be determined using coordinate systems other than the one shown here.

The reflection spot 410 is represented in the image 400 by a saturated region defined by a boundary 420, which encloses a group of saturated pixels. The position of the reflection spot 410 can be defined as the center of the boundary 420, or as the average location of the pixels within the boundary 420.

Example 6

Exemplary Rotation Parameter of a Picture-Taking Device

A rotation parameter as described herein is any parameter that describes the rotation of a picture-taking device relative to a surface in a picture taken by the device. In practice, for example, when a user takes a picture of a whiteboard surface with a camera, it is often difficult to ensure that the camera is parallel to the whiteboard surface. Thus, the camera is likely rotated relative to the whiteboard surface. Such a rotation is also referred to as a tilting of the device. If the picture-taking device is represented by a plane parallel to the lenses or sensor of the device, a tilt angle of the device is represented by the angle of intersection between the surface being photographed and the plane of the device. However, the tilt angle can also be measured relative to a line perpendicular to the plane of the device. The tilt angle can also be represented by two angles as measured within a particular coordinate system. For example, rotation parameters can include a vertical and a horizontal tilt angle, or an angle in the x-direction and an angle in the y-direction.

Figure 5A:
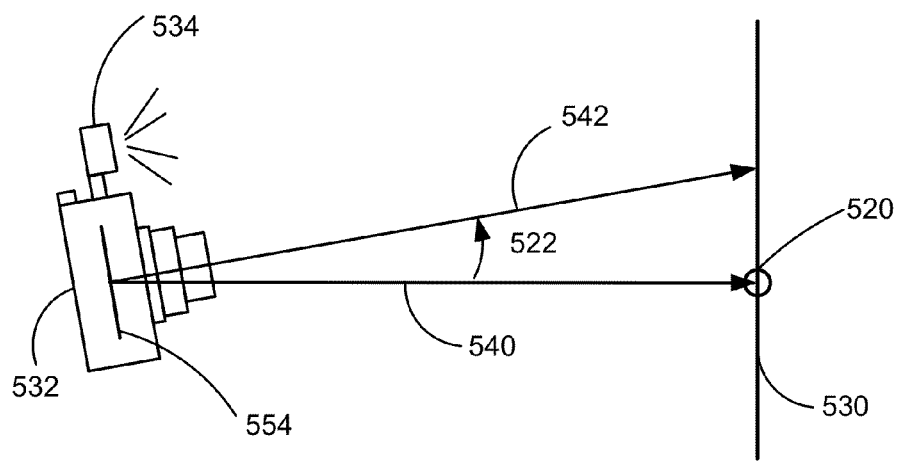
FIG. 5A is a diagram illustrating a vertical tilt angle of a picture-taking device.
Figure 5B:
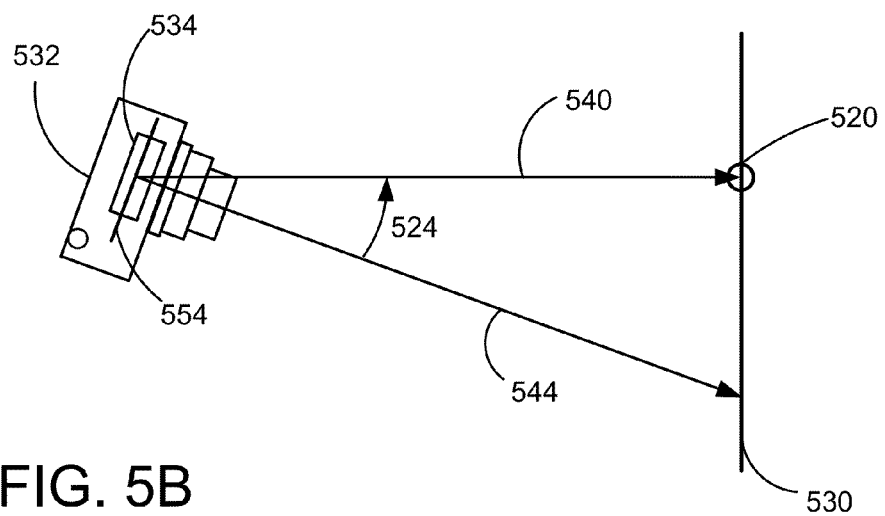
FIG. 5B is a diagram illustrating a horizontal tilt angle of a picture-taking device.

FIGS. 5A and 5B illustrate exemplary rotation parameters. FIG. 5A shows a side-view of a picture-taking device 532 having a flash unit 534 and taking a picture of a vertical surface 530. The surface 530 is any surface with reflective properties. Exemplary surfaces include a wall, a whiteboard, a window, a glass or metallic surface, a floor, or other substantially flat and at least partially reflective surface. Surfaces other than these can create reflection spots, however corrections or additional calculations may need to be performed to determine tilt angle. (For example, the diagram of FIG. 6 would be more complicated if the surface was other than substantially flat.)

Referring to FIG. 5A, a line 542 is drawn perpendicular to a plane 554 intersecting the picture-taking device 532. The line 542 points from the plane 554 to the portion of the surface 530 that appears at the center of the picture being taken. The plane 554 can be coplanar with the sensor or focal plane of the picture-taking device 532, and the line 542 can extend from a center of the sensor or of the lens system of the camera. However, this exact positioning of the plane 554 and the origin of line 542 is not necessary. In practice, the distance between the picture-taking device 532 and the surface 530 being photographed is much larger than the dimensions of the device 532. Thus, the exact placement of the plane 554 and the origin of the line 542 does not have a significant effect on the calculations described herein. In other words, the device 532 can be treated as a point, without dimension. However, if the distance to the surface 530 is reduced such that it is similar in magnitude to the dimensions of the device 532, the plane 554 can be located at a focal plane of the device 532.

A line 540 is drawn perpendicular to the surface 530 and points to the portion 520 of the surface 530 where light from the flash unit 534 reflects off of the surface 530 to create a reflection spot in the picture being taken. The line 540 is shown to intersect the line 542 because, as stated above, when the distance between the picture-taking device 532 and the surface 530 is much larger than the dimensions of the device 532, the device 532 can be treated as a point, without dimension. If, however, the distance is reduced or the flash unit is displaced a significant distance from the device 532 (e.g., if the flash unit is a separate stand-alone flash unit), the separation between the flash unit 534 and the camera 532 can be taken into account. That is, the line 540 can extend from the flash unit 530 perpendicular to the surface 530. The lines 542 and 540 intersect to define a tilt angle 522 of the picture-taking device 532. Because the view in FIG. 5A is from the side of the device 532 and the surface 530 is vertical, the angle 522 can be referred to as a vertical tilt angle.

FIG. 5B shows a top-view of the picture-taking device 532 and flash unit 534. A line 544 is drawn perpendicular to the plane 554 and points to the portion of the surface 530 that appears at the center of the picture being taken. The line 544 intersects the line 540 to define a tilt angle 524 of the picture-taking device 532. Because the view in FIG. 5B is from the top of the device 532 and the surface 530 is vertical, the angle 524 can be referred to as a horizontal tilt angle.

Although the angles 522 and 524 have been defined in FIGS. 5A and 5B as part of a vertical and horizontal coordinate system, other coordinate systems can be used to define the tilt angle of the device 532.

Example 7

Exemplary Calculation of a Picture-Taking Device Tilt Angle

Figure 6:
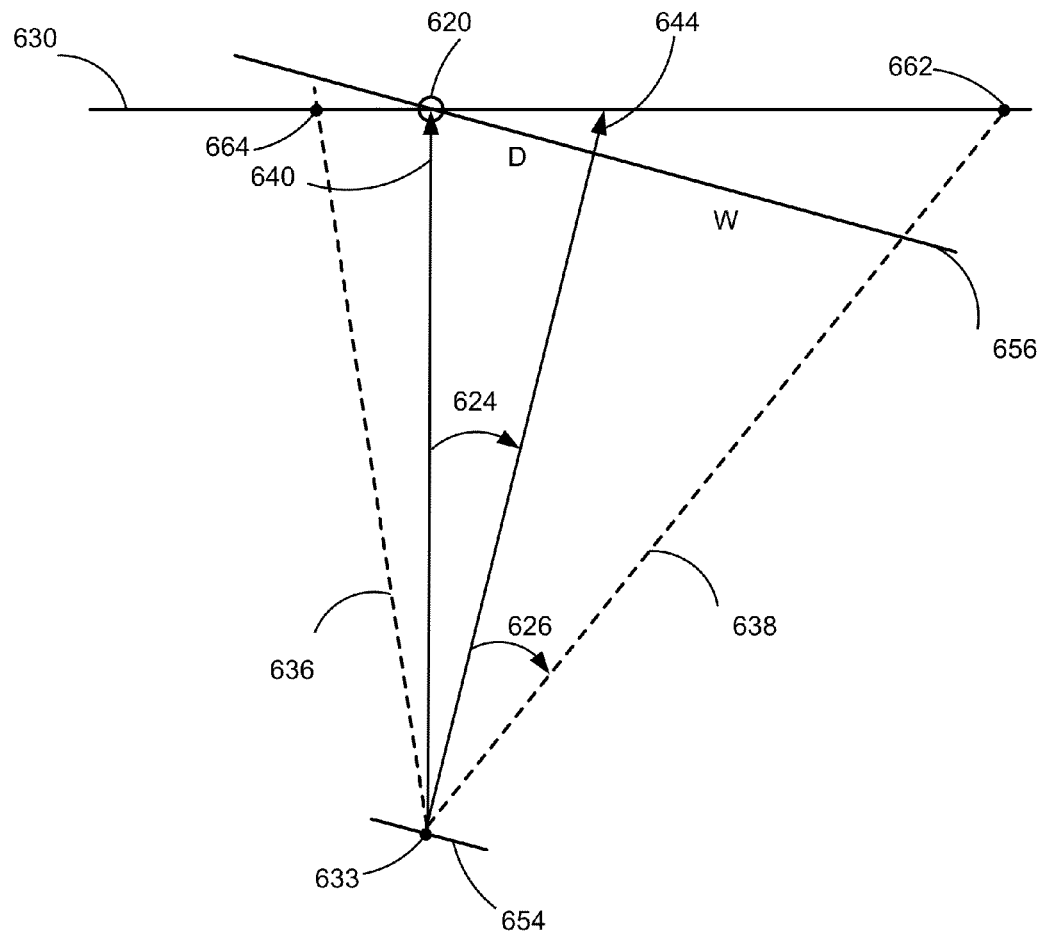
FIG. 6 is a diagram illustrating angles and distances used in an exemplary calculation of a picture-taking device tilt angle.

FIG. 6 is a diagram illustrating angles and distances used in an exemplary calculation of a picture-taking tilt angle 624. In the figure, a picture-taking device as described herein is represented by a point 633 and a plane 654, and is taking a picture of a surface 630. The plane 654 can be coplanar with the sensor or focal plane of the picture-taking device. A line 644 is drawn perpendicular to the plane 654 and points to the portion of the surface 630 that appears at the center of the picture being taken. A line 640 is drawn perpendicular to the surface 630 and points to the portion 620 of the surface 630 where light sourced or produced by the picture-taking device represented by the point 633 reflects off of the surface 630 to create a reflection spot in the picture being taken. The line 644 intersects the line 640 to define a tilt angle 624 of the picture-taking device represented by the point 633.

Lines 636 and 638 define an angle of view of the picture-taking device, and the angle of view is bisected by the line 644. Thus, angle 626 represents half of the angle of view of the picture-taking device. In general, the angle of view of a picture-taking device describes the two-dimensional area that is captured by a picture taken by the device, and is sometimes referred to as a field of view. Thus, referring to FIG. 6, the portion of the surface 630 within the angle of view defined by lines 636 and 638 (e.g., the portion of the surface 630 between points 662 and 664) is captured in the picture taken by the device. Whereas portions of the surface 630 not within the angle of view does not appear in the picture. The angle of view can be measured horizontally, vertically, diagonally, or within a Cartesian or other coordinate system. The angle of view can be a parameter that is predetermined for a particular device, or it can be calculated from other parameters of the device. For example, the angle of view of a camera can be calculated from the focal length of the camera lens and a dimension of the film or sensor used by the camera to capture the image. A horizontal and vertical angle of view of a camera can be calculated from the focal length of the camera and the width and height of the film or sensor used by the camera to capture the image. The angle of view can also depend on other camera parameters. Well-known techniques exist in the art for calculating or determining the angle of view of a picture-taking device.

Referring to FIG. 6, a plane 656 is drawn parallel to the plane 654 and is perpendicular to the line 644. A segment D represents a distance between the line 644 and the line 640 as measured along the plane 656. The segment D corresponds to the distance between the center of the picture being taken and the reflection spot in the picture caused by the reflection at region 620. A segment W represents a distance between the line 644 and the line 638 as measured along the plane 656. The segment W corresponds to the half-width of the picture being taken. That is, W corresponds to the distance between the center and an edge of the picture. Using trigonometric formulas, a value for the tilt angle 624 can be determined as follows: Angle 624=arctan((D/W)*tan(Angle 626)). Values for the lengths of segment D and of segment W can be calculated using tools and techniques described herein.

Although the plane 656 is shown in the figure to intersect the surface 630 at the line 640, the plane 656 can be located at a different position along the line 644, while remaining perpendicular to the line 644. This is because shifting the plane 656 along the line 644 creates similar triangles such that the ratio of D to W remains constant.

The calculation of the tilt angle 624 shown in FIG. 6 can be performed multiple times, such as for different directions of rotation of the picture-taking device. For example, the calculation can be performed for a horizontal tilt angle as well as for a vertical tilt angle.

Example 8

Exemplary Method for Calculating a Rotation of a Picture-Taking Device

Figure 7:
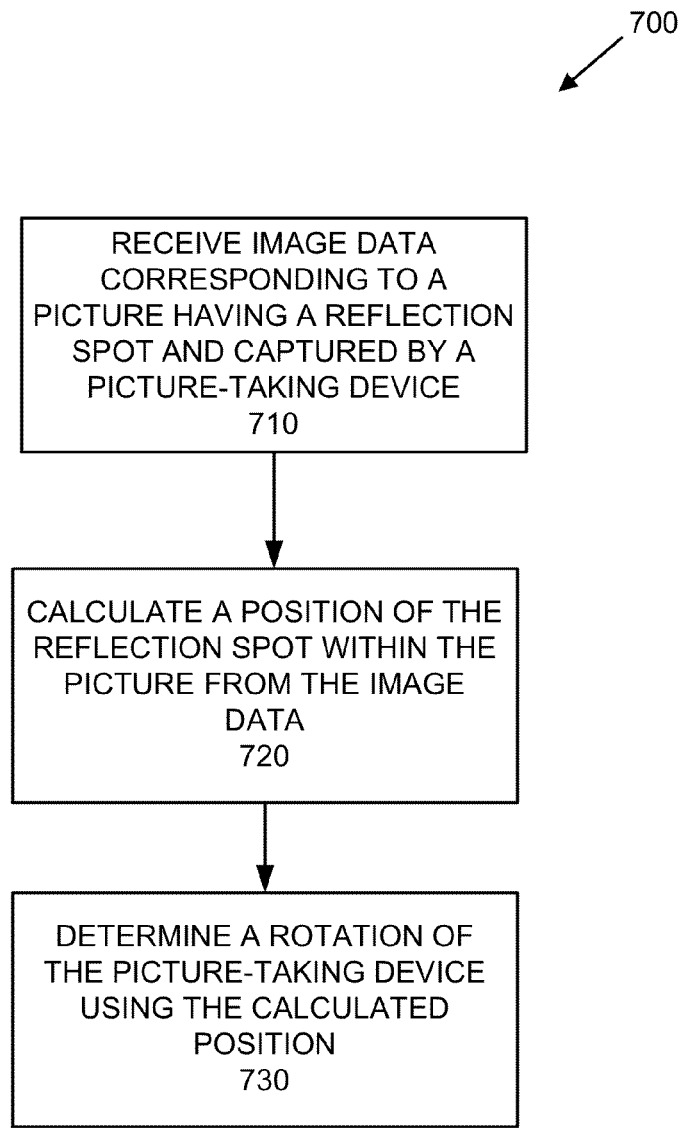
FIG. 7 is a flowchart of an exemplary method for performing perspective correction.

FIG. 7 is a flowchart of an exemplary method 700 for calculating a rotation of a picture-taking device. The method 700 can be implemented using tools and techniques described herein. At 710, image data corresponding to a picture captured by a picture-taking device is received. The picture has a reflection spot caused by reflection of light sourced by the picture-taking device off a surface in the picture. At 720, a position of the reflection spot within the picture is calculated from the image data. At 730, a rotation of the picture-taking device relative to the surface is determined using the calculated position. The calculated rotation can then be used for performing perspective correction on the picture or on another picture taken by the picture-taking device.

Example 9

Exemplary Method of Capturing an Image with a Reflection Spot

Figure 8:
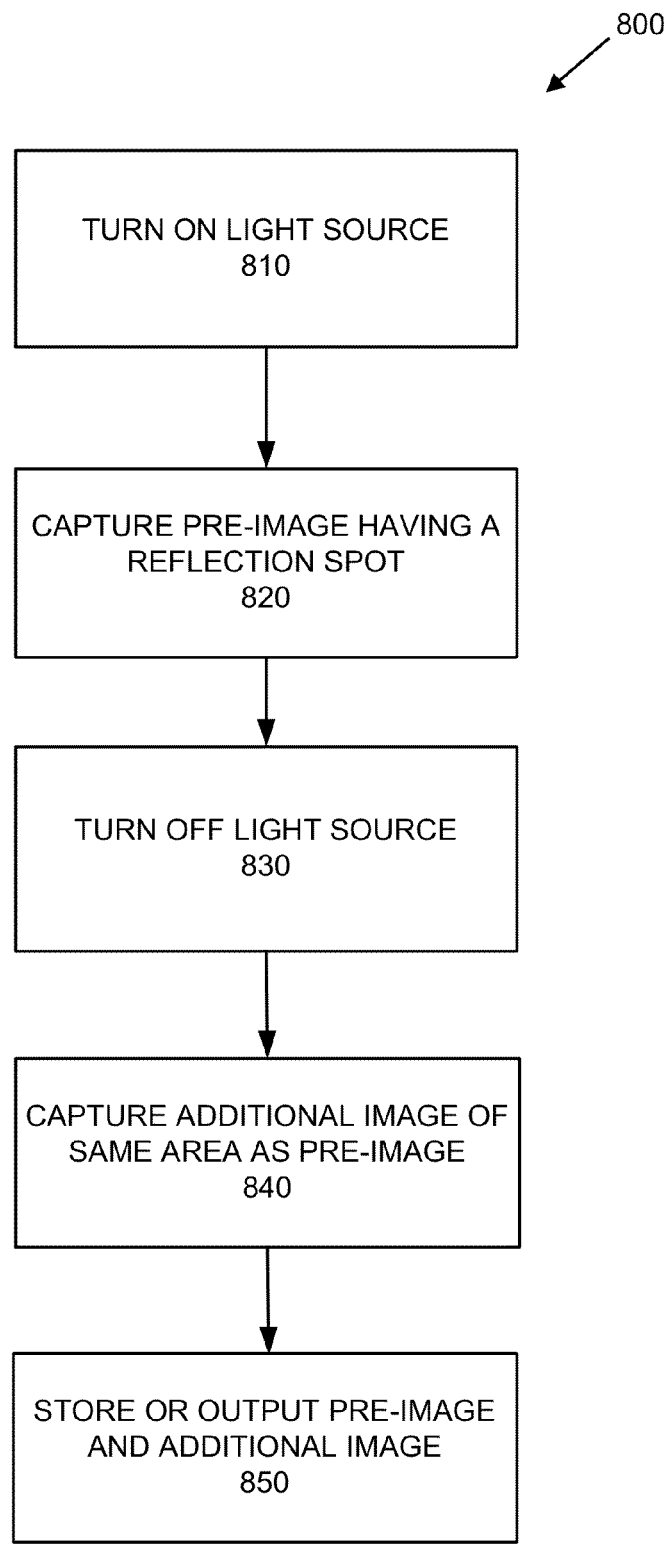
FIG. 8 is a flowchart of an exemplary method of capturing an image with a reflection spot.

FIG. 8 is a flowchart of an exemplary method 800 for capturing an image with a reflection spot. The method 800 can be implemented using a picture-taking device described herein. At 810, a light source is turned on. The light source is sourced or produced by the picture-taking device as described herein. At 820, a pre-image having a reflection spot is captured by the picture-taking device. The reflection spot is caused by the light reflecting off of a surface captured in the pre-image. At 830, the light source is turned off. At 840, an additional image is captured of the same area captured by the pre-image. At 850, the pre-image and/or the additional image are output or stored in memory. The pre-image can then be subjected to a method such as method 700 in FIG. 7. For example, image data corresponding to the pre-image can be received, and a position of the reflection spot within the pre-image can be calculated. A rotation of the picture-taking device relative to the surface can be calculated using the position. The rotation can then be used for performing perspective correction on the additional image.

Alternatively, the method 800 can be implemented by capturing a single image, and not by capturing a pre-image and an additional image. For example, the light source turned on at 810 can be infrared light or polarized light. At 820, an image having a reflection spot can be captured, and, at 830, the light source can be turned off. Then, at 840, no additional image can be captured. The image can then be subjected to a method such as method 700 in FIG. 7. Image data corresponding to the image can be received, and a position of the reflection spot within the image can be calculated. The rotation of the picture-taking device relative to the surface can be determined using the calculated position. The rotation can then be used for performing perspective correction on the image.

Typically, the method 800 is performed quickly, such that the pre-image and the additional image are captured in quick succession. For example, the additional image can be taken less than 1/10 of a second, 1/100 of a second, or 1/1000 of a second after the pre-image, such that the picture-taking device does not move significantly in between the capturing of the pre-image and the capturing of the additional image. However, the method 800 can be performed over a longer period of time, or performed only once for a series of images. For example, if a camera is in a fixed or semi-permanent position, a pre-image may be taken in order to determine a rotation of the camera. Several images can then be corrected for perspective distortion based on the reflection spot from the one pre-image. An additional pre-image can be taken if the position or rotation of the camera is subsequently modified.

Example 10

Exemplary Method of Calculating a Position of a Reflection Spot

Figure 9:
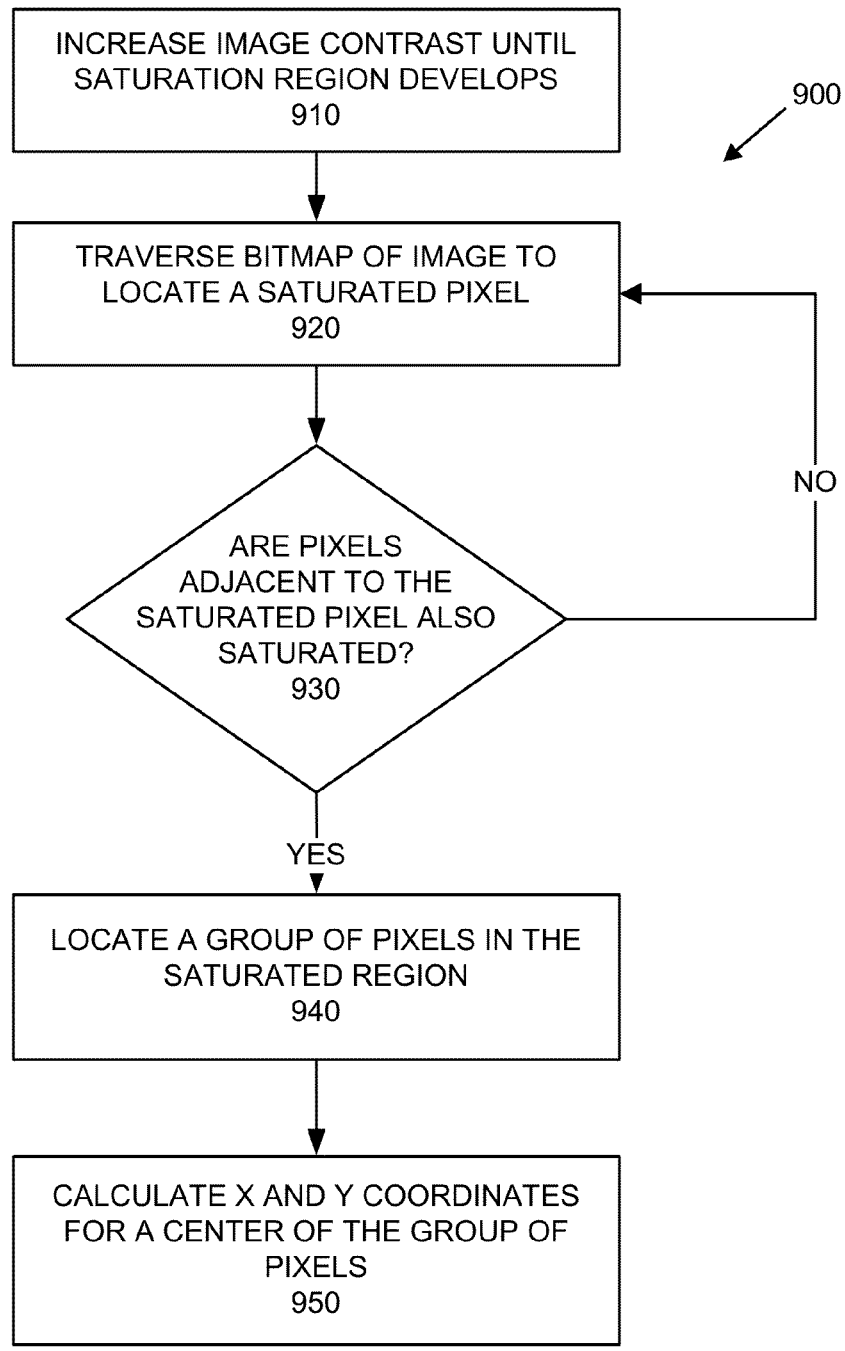
FIG. 9 is a flowchart of an exemplary method of calculating a position of a reflection spot within an image.

FIG. 9 is a flowchart of an exemplary method 900 for calculating a position of a reflection spot within an image. The method 900 can be applied to any image described herein having a reflection spot. In general, the method 900 uses techniques known in the art for detecting saturated pixels in order to calculate the position of the reflection spot. Thus, at 910, contrast of the image is increased until a saturation region, which corresponds to the reflection spot, develops. However, if the image already contains a saturation region, it may not be necessary to increase the image contrast, and the method 900 can proceed directly to 920. At 920, a bitmap of the image is traversed to locate a saturated pixel. Other techniques known in the art can also or alternatively be used to locate the saturated pixel. At 930, it is determined whether pixels adjacent to the located saturated pixel are also saturated. If not, the located saturated pixel likely corresponds to an isolated saturated pixel. Thus, the method 900 returns to 920 and continues to traverse the bitmap until another saturated pixel is located. If pixels adjacent to the located saturated pixel are also saturated, the located saturated pixel likely corresponds to one of a group of saturated pixels defining the saturated region. At 940, the group of pixels defining the saturated region are located. At 950, a position for the saturation region is determined by calculating an x coordinate and a y coordinate for a center of the group of pixels. For example, the locations or x and y coordinates for each of the pixels in the group can be averaged to determine a location for the center of the group of pixels.

A person of ordinary skill in the art would understand that other methods exist for determining the position of the reflection spot. For example, another method that could be used is machine learning. A standardized set of images with reflection spots could be used to do comparisons with the received image and to approximate the location of the reflection spot.

Example 11

Exemplary Method of Calculating a Tilt Angle

Figure 10:
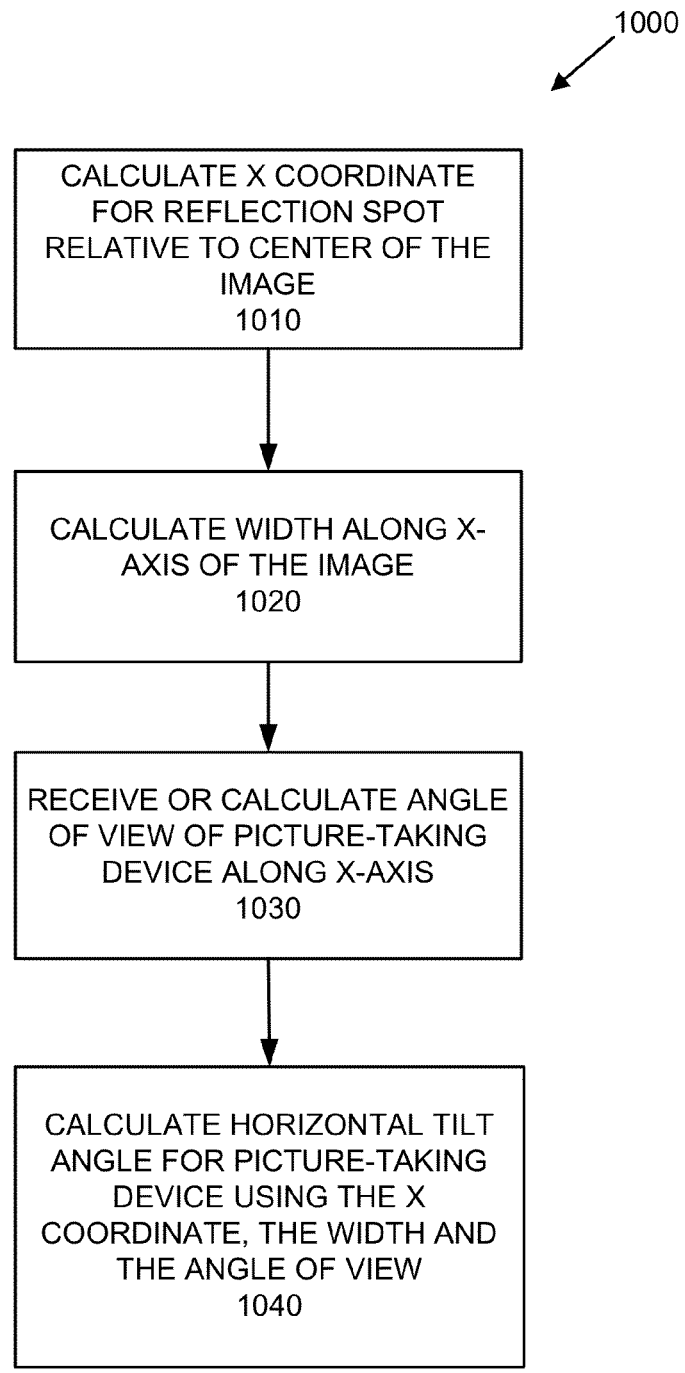
FIG. 10 is a flowchart of an exemplary method of calculating a picture-taking device tilt angle using an image with a reflection spot.

FIG. 10 is a flowchart of an exemplary method 1000 for calculating a picture-taking device tilt angle using an image with a reflection spot. The method 1000 can be applied to any image described herein having a reflection spot. At 1010, an x coordinate for the reflection spot is calculated relative to a center of the image. At 1020, a width of the image along an x-axis is calculated. At 1030, an angle of view of the picture-taking device along the x-axis is calculated or received. At 1040, a horizontal tilt angle for the picture-taking device is calculated using the x coordinate, the width, and the angle of view. The horizontal tilt angle can then be used to perform perspective correction on the image or on another image.

The method 1000 determines the horizontal tilt angle of the picture-taking device using distances and parameters calculated relative to the x-axis. The method 1000 can be modified and repeated to determine a vertical tilt angle using distances and parameters calculated relative to a y-axis. Further, the method 1000 can be modified to determine the tilt angle according to a different coordinate system.

Exemplary Advantages

Using a reflection spot to determine a rotation for a picture-taking device, as described herein, can have advantages. For example, perspective correction techniques can be performed on the image without first determining a location of an edge of a surface within the image. This is advantageous because it is not always possible, or maybe difficult, to take a picture that includes an edge of the surface being photographed. Although images described herein can include edges of the surfaces, the edges need not be detected before perspective correction techniques are applied to the image.

Thus, techniques and tools described herein allow perspective correction to be performed on images without edges, whereas such images may not be as easily corrected for perspective distortion using conventional techniques. Further, techniques and tools described herein allow perspective correction techniques to be applied to images without knowing or detecting the content of the image (beyond calculation of a reflection spot position).

Exemplary Applications

Tools and techniques described herein can be used, for example, to correct perspective distortion that occurs in pictures taken of whiteboards. For example, whiteboards are commonly used in classrooms and office workspaces for presenting and discussing ideas. Sometimes it is desirable to save or transmit the material that is written on the whiteboard. An office may want to transmit the material to a remote office or to save it as a record or notes of a meeting. A school may want to save the material for remote viewing by students or for distribution of digital lecture notes. In order to photograph the whiteboard without perspective distortion, the camera should be specifically located to have minimal or no rotation relative to the whiteboard. This may be inconvenient or impossible, thus the photograph will likely contain perspective distortion. However, such distortion may make the material written on the whiteboard difficult or annoying to read, and text translation programs such as optical character recognition may not be able to convert the material into digital text. Conventional techniques for perspective correction require that the photo include an edge of the whiteboard in order to correct the distortion. However, it is not always practical or convenient to take a picture that includes the edge. For example, the viewfinder of the camera may not be able to be positioned so as to contain an edge (e.g., the room containing the whiteboard may be small, or the feasible locations for a camera in the room may be limited), or the space containing the desired information on the whiteboard may be small with respect to the complete whiteboard (including edges). Thus, it can be advantageous to be able to perform perspective correction without edge detection. Applying techniques and tools described herein, rotation parameters of the device capturing the picture can be calculated using a reflection of light off of the whiteboard being photographed. Consequently, perspective correction can be performed without the need for edge detection.

Although tools and techniques described in this application are, in some examples, illustrated in conjunction with perspective correction techniques, calculations described herein can also be used in conjunction with other image processing techniques. For example, calculations of a rotation parameter for a picture-taking device can be used to perform image-rectification, to determine the "pose" of an object (for computer vision applications), or in homography.

Example of an Implementation Environment

FIG. 11 illustrates a generalized example of a suitable implementation environment 1100 in which described embodiments, techniques, and technologies may be implemented.

In example environment 1100, various types of services (e.g., computing services) are provided by a cloud 1111. For example, the cloud 1110 can comprise a collection of computing devices, which may be located centrally or distributed, that provide cloud-based services to various types of users and devices connected via a network such as the Internet. The implementation environment 1100 can be used in different ways to accomplish computing tasks. For example, some tasks (e.g., processing user input and presenting a user interface) can be performed on local computing devices (e.g., connected devices 1130, 1140, 1150) while other tasks (e.g., storage of data to be used in subsequent processing) can be performed in the cloud 1110.

In example environment 1100, the cloud 1110 provides services for connected devices 1130, 1140, 1150 with a variety of screen capabilities. Connected device 1130 represents a device with a computer screen 1135 (e.g., a mid-size screen). For example, connected device 1130 could be a personal computer such as desktop computer, laptop, notebook, netbook, or the like. Connected device 1140 represents a device with a mobile device screen 1145 (e.g., a small size screen). For example, connected device 1140 could be a mobile phone, smart phone, personal digital assistant, tablet computer, or the like. Connected device 1150 represents a device with a large screen 1155. For example, connected device 1150 could be a television screen (e.g., a smart television) or another device connected to a television (e.g., a set-top box or gaming console) or the like.

One or more of the connected devices 1130, 1140, 1150 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1100. For example, the cloud 1110 can provide services for one or more computers (e.g., server computers) without displays.

Services can be provided by the cloud 1110 through service providers 1120, or through other providers of online services (not depicted). For example, cloud services can be customized to the screen size, display capability, and/or touchscreen capability of a particular connected device (e.g., connected devices 1130, 1140, 1150).

In example environment 1100, the cloud 1110 provides the technologies and solutions described herein to the various connected devices 1130, 1140, 1150 using, at least in part, the service providers 1120. For example, the service providers 1120 can provide a centralized solution for various cloud-based services. The service providers 1120 can manage service subscriptions for users and/or devices (e.g., for the connected devices 1130, 1140, 1150 and/or their respective users). Such cloud-based services can include providing applications to local computing devices 1130, 1140, 1150 configured as picture-taking devices described herein for performing perspective correction using a reflection. Service providers 1120 can also provide perspective correction using a reflection for images captured by one or more of the computing devices 1130, 1140, 1150 and transmitted to the cloud 1110.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

We claim:

1. A method for performing perspective correction, comprising:
   receiving image data corresponding to a picture captured by a picture-taking device, the picture having a reflection spot caused by reflection of light sourced by the picture-taking device off a surface;
   calculating a position of the reflection spot within the picture from the image data; and
   determining a rotation of the picture-taking device relative to the surface using the calculated position, the rotation being used for performing the perspective correction.

2. The method of claim 1, wherein the calculating of the position of the reflection spot within the picture comprises determining an x coordinate and a y coordinate for the reflection spot from the image data, and the determining of the rotation of the picture-taking device relative to the surface uses the x coordinate and the y coordinate.

3. The method of claim 1, wherein the reflection spot corresponds to a region of saturation within the picture, the calculating of the position of the reflection spot comprises determining an x coordinate and a y coordinate for a center of the region of saturation from the image data, and the determining of the rotation of the picture-taking device relative to the surface uses the x coordinate and the y coordinate.

4. The method of claim 1, wherein the reflection spot corresponds to a region of saturation within the picture, the region defined by a plurality of saturated pixels, and the calculating of the position of the reflection spot comprises determining a distance in pixels from a center of the picture for the plurality in saturated pixels.

5. The method of claim 1, wherein the surface is a vertical surface and the determining of the rotation of the picture-taking device comprises determining a vertical tilt angle and a horizontal tilt angle of the picture-taking device.

6. The method of claim 1, further comprising:
   applying a perspective correction transform to the image data using the rotation of the picture-taking device.

7. The method of claim 1, wherein the image data is a first set of image data that corresponds to a first picture of a viewing area, the surface being in the viewing area, further comprising:
   receiving a second set of image data corresponding to a second picture of the surface and the viewing area; and
   applying a perspective correction transform to the second image using the rotation of the picture-taking device.

8. The method of claim 1, further comprising:
   receiving one or more parameters of the picture-taking device related to an angle of view of the picture-taking device, wherein the determining of the rotation of the picture-taking device is performed using the position of the reflection spot within the picture and the one or more parameters.

9. The method of claim 1, wherein the picture-taking device is a camera that is part of a mobile telephone.

10. The method of claim 1, wherein the calculating of the position of the reflection spot within the picture comprises determining an x coordinate along an x axis and a y coordinate along a y axis for the reflection spot from the image data, the method further comprising:
    generating the light sourced by the picture-taking device;
    capturing the picture having the reflection spot;
    determining a first width along the x-axis and a second width along the y-axis for the picture from the image data;
    receiving a predetermined value for an angle of view of the picture-taking device, wherein the determining of the rotation of the picture-taking device relative to the surface is performed using the angle of view, the first and the second width, the x coordinate, and the y coordinate; and
    applying a perspective correction transform to the image using the rotation of the picture-taking device.

11. The method of claim 1, wherein the surface is a surface of a whiteboard and the picture does not include an edge of the whiteboard, or the picture includes the edge of the whiteboard and the method further comprises applying a perspective correction transform to the image data using the rotation of the picture-taking device and without using a position of the edge of the whiteboard within the picture.

12. One or more computer storage devices storing computer-executable instructions, which, when executed by a computer, cause the computer to perform a method comprising:
    receiving an image taken by a picture-taking device of a portion of a surface, the image having a plurality of pixels corresponding to a reflection off of the surface of light produced by the picture-taking device;
    calculating a position within the image for the plurality of pixels; and
    determining a tilt angle of the picture-taking device using the calculated position of the plurality of pixels within the image.

13. The one or more computer storage devices of claim 12, wherein the method further comprises:

receiving or calculating a value for an angle of view of the picture-taking device, wherein the determining of the tilt angle of the picture-taking device is performed using the calculated position for the plurality of pixels and the value for the angle of view.

14. The one or more computer storage devices of claim 12, wherein the calculating of the position for the plurality of pixels comprises calculating the position within the image for a plurality of saturated pixels.

15. The one or more computer storage devices of claim 12, wherein the calculating of the position within the image for the plurality of pixels comprises calculating an x coordinate and a y coordinate for a center of the plurality of pixels.

16. The one or more computer storage devices of claim 12, wherein the calculating of the position within the image for the plurality of pixels comprises calculating a distance (DX) along an x-axis and a distance (DY) along a y-axis for a center of the plurality of pixels, the method further comprising:
   calculating a width (WX) along the x-axis and a width (WY) along the y-axis for the picture; and
   receiving or calculating values for an angle of view (AOVX) along the x-axis and an angle of view (AOVY) along the y-axis of the picture-taking device, wherein the determining of the rotation of the picture-taking device relative to the surface comprises calculating a tilt angle along the x-axis using arctan((DX/WX)*tan(AOVX/2)) and calculating a tilt angle along the y-axis using arctan((DY/WY)*tan(AOVY/2)).

17. The one or more computer storage devices of claim 12, wherein the method further comprises:
   applying perspective correction techniques to the image using the tilt angle, or receiving a second image of the portion of the surface and applying perspective correction techniques to the second image using the tilt angle.

18. A mobile telephone, comprising:
   a camera characterized by an angle of view and configured to generate images of an area within the angle of view;
   a flash unit configured to produce a flash of light to illuminate the area, the camera being configured to generate the images while the flash of light is illuminating the area; and
   an image processing system configured to receive the images, and, for images having a reflection spot produced by the flash of light reflecting off a surface in the area, to determine an x coordinate and a y coordinate of the reflection spot within the image and to determine the tilt angle for the camera based on the x coordinate, y coordinate, and the angle of view; and
   a perspective correction system configured to apply a perspective correction transform to the at least one of the received images using the tilt angle.

19. The mobile telephone of claim 18, wherein the flash unit is configured to produce a flash of infrared light.

20. The mobile telephone of claim 18, wherein the images are pre-images of the area within the angle of view, and the camera is further configured to generate an additional image of the area while the flash unit is not producing the flash of light, the perspective correction transform being applied to the additional image.

21. The method of claim 1, wherein the receiving and the calculating are performed by a processor incorporated in the picture-taking device.

22. The method of claim 1, further comprising:
   performing the perspective correction using the rotation of the picture-taking device so as to generate data for a corrected image from the image data.

23. The one or more computer storage devices of claim 12, wherein the one or more computer storage devices are incorporated in the picture-taking device, and the picture- taking device is configured to apply perspective correction techniques to the image using the tilt angle so as to generate a corrected image.

* * * * *